July 18, 1961   O. A. CARNAHAN   2,992,536
EXTERNAL COMBUSTION GAS ENGINE

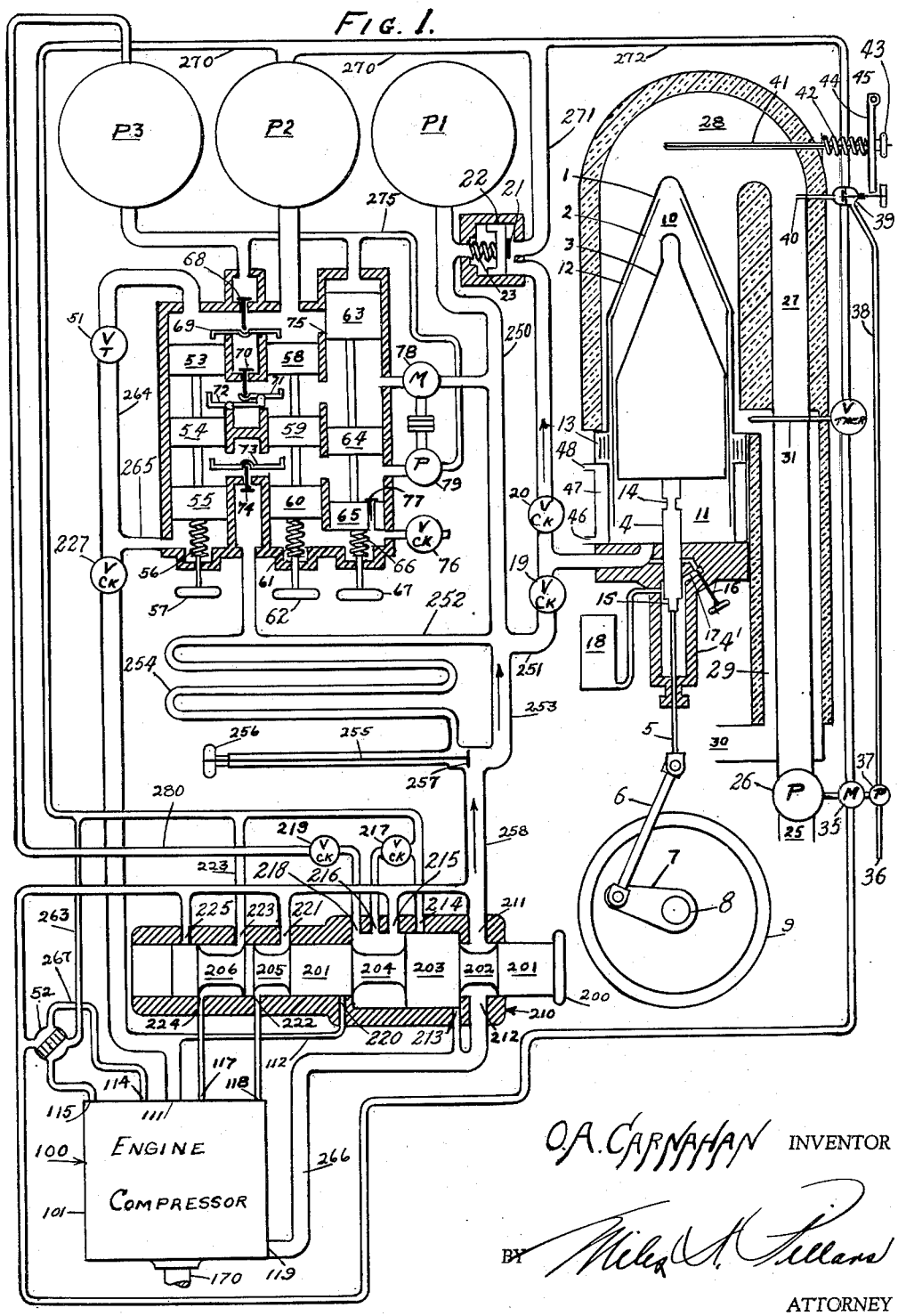

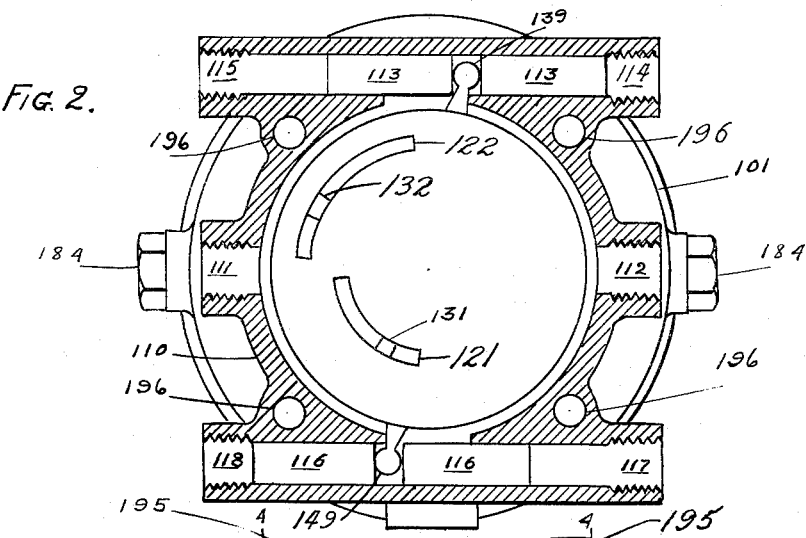
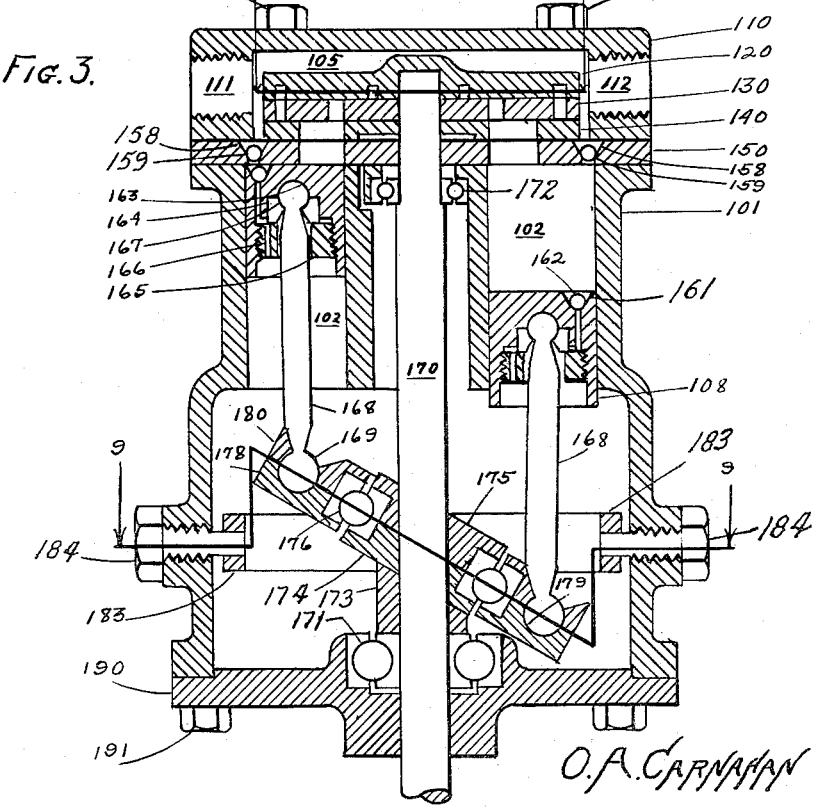

Filed Aug. 5, 1953   5 Sheets-Sheet 3

O.A. CARNAHAN Inventor

July 18, 1961 O. A. CARNAHAN 2,992,536
EXTERNAL COMBUSTION GAS ENGINE
Filed Aug. 5, 1953 5 Sheets-Sheet 4

O.A. Carnahan Inventor

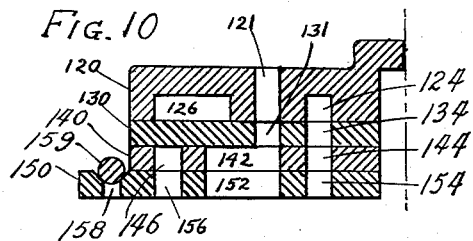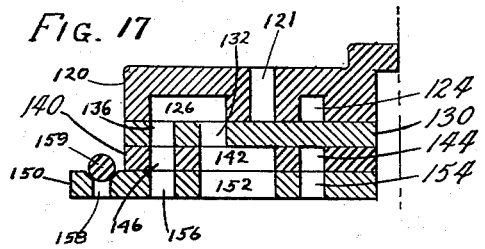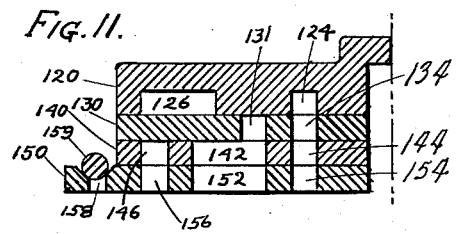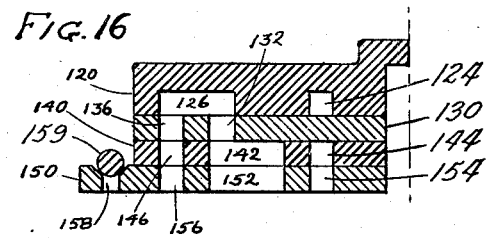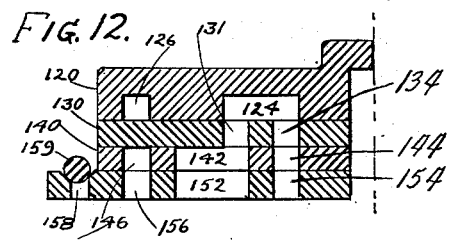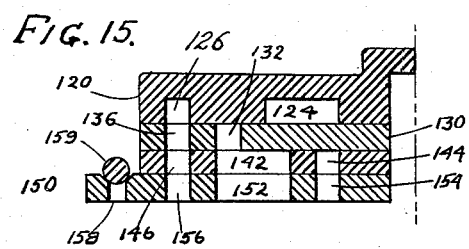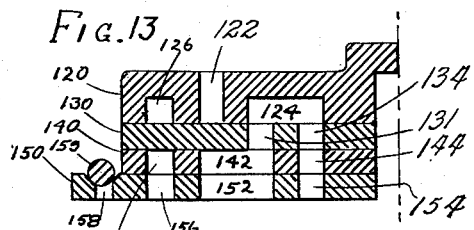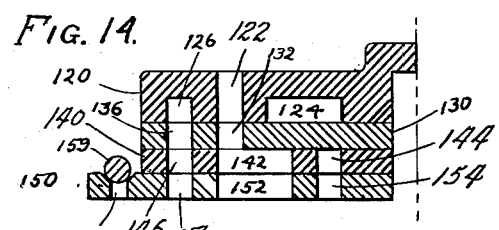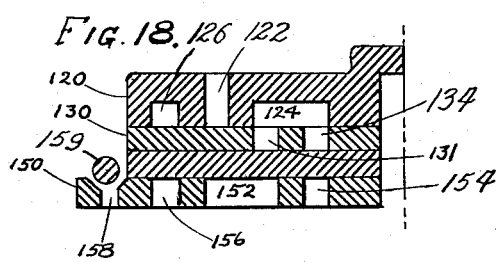

United States Patent Office 2,992,536
Patented July 18, 1961

2,992,536
EXTERNAL COMBUSTION GAS ENGINE
Orson A. Carnahan, 691 Allen St., Syracuse 10, N.Y.
Filed Aug. 5, 1953, Ser. No. 372,504
18 Claims. (Cl. 60—57)

This invention relates to external combustion gas engines, and more particularly to such engines incorporating an improved thermo-gas compressing unit, an improved power output motor, and accessory devices for control thereof in accordance with the power requirements of both stationary and mobile devices.

It is an object of this invention to provide an improved external combustion gas engine which will operate at high efficiency throughout a varying pressure range over a wide range of speeds and torques.

Another object of this invention is to provide an improved engine of the external combustion type which may be operated at high efficiency on solid, liquid, or gaseous fuels, including oils having low volatility and B.t.u. content and atomic heat sources.

Another object of this invention is to provide an inexpensive, but highly efficient, heat exchange unit to transfer large amounts of heat from the external heat source to the gas within the thermo-gas compressing unit.

A still further object of the invention is to provide the furnace of the thermo-compressing unit with a thermostat in the combustion chamber to regulate the fuel flow to maintain most efficient operating temperatures.

Another object of this invention is to provide a thermo-gas compressing unit with a preheater in order to utilize heat from the stack gases.

Another object of the invention is to provide a thermostat at the preheater to control the draft for most efficient fuel-air ratio.

Another object of the invention is to provide a plunger attached to the transfer piston of the thermo-compressing unit to operate the compressor by pressure variation in the thermo-compressor at a speed necessary to meet output demands.

Another object of this invention is to provide a surge chamber wherein energy will be stored during the compression stroke to be utilized on the return stroke.

Another object of this invention is to provide a valve restricted by-pass between the surge chamber and the thermo-compressor cylinder, the valve of which may be utilized to adjust the idling speed of the thermo-compressor when the output of the compressor is low or zero.

Another object of this invention is to provide a back pressure valve which will maintain a pressure variation in the thermo-compressor cylinder when the discharge pressure from the thermo-compressor is low.

Another object of this invention is to provide an improved external combustion engine comprising an output engine having a reversing valve and a single rotary valve with ports to operate in either direction.

A still further object of this invention is to provide an improved multiple cylinder wobble plate engine with a shut-off valve to convert the engine into an air compressor which will furnish negative torque for braking.

A still further object of this invention is to provide a multiple cylinder wobble plate engine with intake and discharge valves for each of the cylinders that become operative when the engine is used as an air compressor.

Another object is to provide the output engine with a torque ring to maintain piston rods in alignment with piston and thus reduce both friction and wear.

A still further object of this invention is to furnish valves for controlling the speed and direction of rotation of the output engine.

It is a further object of this invention to provide an external combustion gas engine with a regulating valve and air driven air compressor to maintain high pressure in a gas receiver.

A still further object of this invention is to furnish an external combustion gas engine with regulating valves used in conjunction with the air driven air compressor to control pressure in a working gas receiver to meet changing torque requirements.

Another object is to furnish an external combustion engine with a sealed lubricating system in which the oil does not come in contact with any hot surfaces.

Another object of this invention is to provide a cooling coil for utilizing the exhaust gases to cool surrounding spaces.

In summation, the overall object of this invention is to provide a highly efficient heat engine that is so flexible in its performance that it can replace presently used engines and their accessories in many applications. For example, it can replace the engine, clutch, transmission, overdrive, friction brakes, and differential of the modern automobile giving all the desirable performance characteristics derived from the use of steam of gas engines.

Other objects and advantages of the invention will become apparent from the following detailed description taken in connection with the accompanying drawings, in which:

FIG. 1 is a diagrammatic drawing of the external combustion gas engine showing the thermo-gas compressing unit, the accessory devices therefor, and the output gas engine from which power is derived with its essential control devices;

FIG. 2 is a plan view partly in cross-section of the engine from which power is derived;

FIG. 3 is a side view partly in cross-section of the engine shown in FIG. 2.

Figure 7:
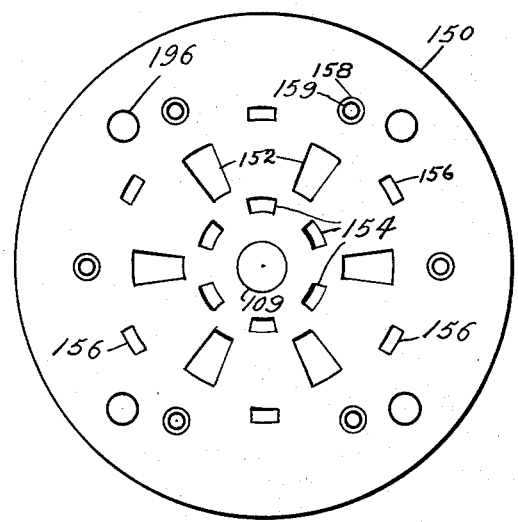
FIG. 7 is a plan view showing the cylinders' head 150 of FIG. 3.
Figure 6:
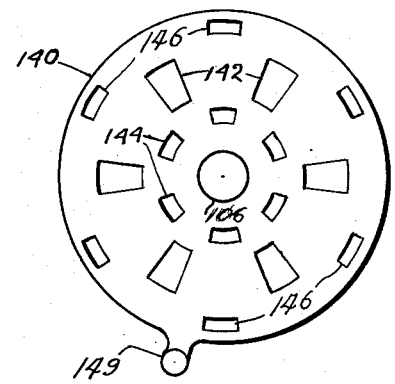
FIG. 6 is a plan view of the On-Off valve 140 of FIG. 3 for converting the engine into an air compressor when negative torque is required.
Figure 8:
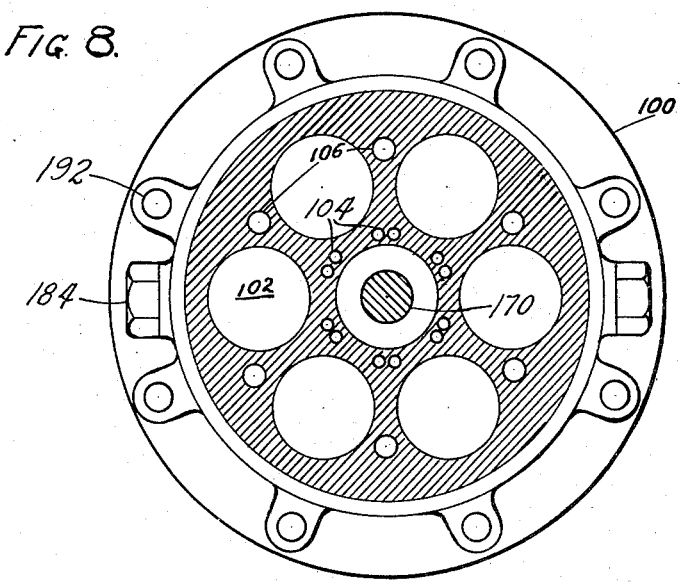
Figure 9:
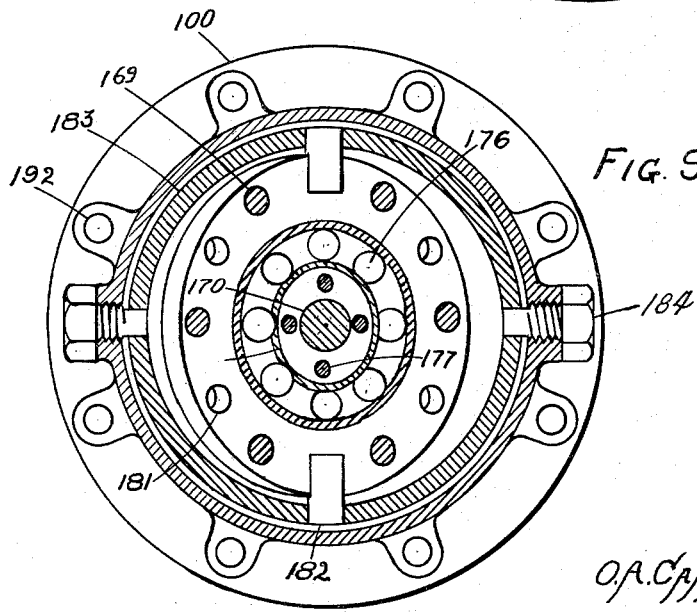

FIG. 8 is a plan view partly in elevation and partly in cross-section showing the cylinders 102 and housing 100 of FIGS. 2 and 3;

FIG. 9 is a sectional view taken along the line 9—9 of FIG. 3 showing the wobble plate and the torque ring assembly; and FIGS. 10 to 18 are cross-sectional views through valve ports taken through cylinder head ports 154, 152, 156, and 158 of FIG. 7 showing registry of ports during various phases of operation.

While this invention is susceptible of various modifications and alternative constructions, I have shown in the drawings and will herein describe in detail the preferred embodiment. It is to be understood, however, that I do not intend to limit the invention by such disclosure, for I aim to cover all modifications and alternative constructions falling within the spirit and scope of the invention as defined in the appended claims.

This application is a continuation-in-part of application Serial No. 29,175, filed May 25, 1948, now patent No. 2,648,527.

In FIG. 1 reference numerals 1 to 49 indicate the details of the automatic thermo-compressor unit and the accessories therefor. Numerals 50 to 77 indicate the valves for manually controlling the speed and direction of rotation of the output engine and the automatic valves for controlling pressure to meet the torque requirements.

Numerals 78 and 79 represent the power and compressor cylinders of an air compressor. Numeral 100 indicates the output engine. Numerals 200 to 225 refer to details of the brake cylinder. Numerals 250 to 280 indicate the piping connections. In FIGS. 2 to 18 inclusive, numerals 101–195 refer to details of the output gas engine.

The thermo-compressor unit is provided with a closed compressor cylinder 1 having an upper hot end of conical or other surface of revolution for conducting large amounts of heat from the furnace 28 to the gas within hot space or chamber 10. The compressor cylinder 1 may be provided with fins to aid the transfer of heat from furnace 28 to the interior of hot chamber 10. The lower cold end or head of this cylinder has a water jacket 47 and the central portion is provided with a heat regenerator 13 provided with passages for the flow of gas. A cylinder liner 2 is concentrically placed within cylinder 1 and spaced with a narrow gas passage 12 leading from the hot space 10 in the upper portion of the hot end or head through the regenerator 13 to the cold space 11. The gas moving or transfer piston 3 has its ends constructed to conform with the ends of cylinder 1 and the cylinder liner 2 and the piston operates in close approximation without touching cylinder liner 2. The stroke of the transfer piston 3 is controlled by the plunger 4, piston rod 5, connecting rod 6, crank 7, shaft 8, and fly wheel 9.

Air for the furnace 28 is supplied by the blower 26 through the air duct 27 and the stack gases are cooled and carried in passage 29 (which in conjunction with air duct 27 constitute a preheater) to the stack 30.

Fuel for the burner 40 is supplied by a supply line 36, fuel pump 37, and fuel line 38. The temperature of the furnace 28 is controlled by the thermostat 41 having an adjusting nut 43 and a fuel valve 39. Spring 42 keeps the fuel valve normally closed while contraction of the thermostat element 41 opens the valve 39 when the furnace temperature is low.

The power plunger or piston 4 positioned in power cylinder 4' serves to furnish the power to operate the compressor by utilizing the variation of pressure in compressor cylinder 1 as is hereinafter discussed in detail. The surge chamber 18 serves to furnish power for the suction stroke by storing the excess power from the compression stroke.

The operation of this thermo-gas compressor is as follows: As the transfer piston 3 moves from the hot end 10 to the cold end 11, it displaces the cold gas from space 11 through the regenerator 13 and annular space 12 to the hot space 10. During this transfer, the gas is heated by the regenerator 13 and by the hot cylinder walls. This latter heating is assisted by the narrow annular space 12 between cylinder 1 and liner 2. This heating of the gas raises the pressure until the back or differential pressure valve 21 opens, after which the pressure remains constant while gas is being discharged through the discharge valve 20, back pressure valve 21, pipes 271 and 270, to working pressure gas receiver or chamber $P_2$. On the return or suction stroke the hot gas in space 10 flows through annular space 12 and regenerator 13 to the cold space 11 leaving heat in regenerator 13 and being further cooled by the water jacket 47. This cooling of the gas causes the pressure to fall during the first part of the stroke and then the pressurer remains constant while gas flows from the low pressure receiver or chamber $P_1$ through pipes 250 and 251 and valve 19 to the cold end 11 of compressor cylinder 1. Since the pressure in cylinder 1 rises during the first part of the compression stroke and remains high during the latter part of the stroke while it falls during the first part of the suction stroke and remains low during the later part of the suction stroke, the mean pressure on the compression stroke is higher than the mean pressure on the suction stroke.

During the compression stroke the pressure in cylinder 1 acts on transfer piston 3 and plunger 4 to compress gas in the surge chamber 18 and also furnish power to operate the compressor. On the return stroke the pressure in the surge chamber 18 acts on plunger 4 overcoming the pressure in cylinder 1 and also furnishes power to drive the compressor. If no gas is taken from pressure chamber $P_2$ the operation of the thermo-compressor takes air from the low pressure receiver $P_1$ and delivers it to pressure chamber $P_2$ which increases the pressure ratio between the gases in chambers $P_2$ and $P_1$. As the pressure ratio increases the discharge from the thermo-compressor decreases and the mean pressure in the compressor cylinder 1 during the compression stroke approaches the mean pressure during the suction stroke due to the shorter length of dwell of the high pressure and the low pressure at the ends of the strokes. Less power is therefore available to drive plunger 4 and the speed of the compressor decreases. If no gas is taken from pressure chamber $P_2$, the discharge from the compressor continues to decrease and the compressor would stop except for the fact that the power plunger 4 has two reduced sections 14 and 15 which act as ports for the transfer of gas from the cylinder 1 to the surge tank 18. If the valve 16 is open when reduced section 14 moves adjacent to the port of by-pass 17 at the end of the compression stroke, the high pressure gas in cylinder 1 flows through the by-pass 17 to surge tank 18. On the return or suction stroke the high pressure gas in surge tank 18 acts on plunger 4 to overcome the more rapidly falling pressure in cylinder 1 and also furnish power to operate the compressor. At the end of the suction stroke reduced section 15 moves adjacent to port of by-pass 17 allowing the high pressure gas in surge chamber 18 to flow into cylinder 1 so that on the compression stroke the rapidly rising pressure in cylinder 1 serves to compress the gas in surge chamber 18 and furnish power to operate the compressor. By adjusting the manually operable valve 16 the idling speed of the compressor may be controlled. When gas is drawn from pressure chamber $P_2$ and the pressure ratio $P_2/P_1$ is decreased, the thermo-compressor speed automatically increases to meet the increased demand. The thermo-gas compressor thus serves as a self-contained unit which takes gas from the low pressure receiver $P_1$ and delivers it to the high pressure receiver $P_2$ maintaining the working pressure ratio $P_2/P_1$.

It will be noted that the thermostat 41 controls the fuel flow to burner 40 so as to maintain the temperature in the combustion chamber 28 for most efficient operation and that the thermostat 31 actuated by the temperature of the gas entering the preheater 27 and 29 controls the flow of gas to the auxiliary engine 34 to operate the blower 26 to give the best fuel-air ratio.

The efficiency of the thermal compressor depends on the temperatures of the hot and cold ends of the compressor cylinder and theoretically is $$\frac{T_1-T_2}{T_1}$$

where $T_1-T_2$ equals the difference of temperatures and $T_1$ the absolute temperature. This efficiency is independent of the pressure of the gas in the cylinder and therefore remains nearly constant regardless of the working pressure.

If the pressure in the high pressure gas receiver $P_3$ is less than the setting of the control spring 66 the spring opens the valve 75 to admit air from $P_2$ to the power cylinder of the gas driven motor 78 which is mechanically connected to gas compressor 79, from which the air is exhausted to gas receiver $P_1$, through pipe 250. The compressor 79 then operates to draw atmospheric air through the make-up valve 76, compress it and deliver it through pipe 275 to high pressure receiver $P_3$. This continues until the pressure in $P_3$ acting on the piston 63 is sufficient to close the valve 75 against the force of spring 66. The thermo-air compressor then slows down to idling speed ready for operation whenever the pressure drops in $P_3$, or when the pressure ratio $P_2/P_1$ drops below the pressure ratio of the thermo-gas compressor.

The structure of the output engine 100 is disclosed in FIGURES 2 to 18 inclusive, wherein 101 represents a cylinder block of a multiple cylinder wobble plate motor. A closure plate 190 is positioned at one end of cylinder block 101 and secured thereto by bolts 191. Bearing 171 is supported by closure plate 190 in which the engine or power shaft 170 freely rotates on the longitudinal axis of the cylinder block 101. An apertured cylinder head 150, best shown in FIGURE 7, is secured at the opposite end of cylinder block 101. A plurality of engine cylinders 102 are equally spaced around the axis of shaft 170 in engine block 101 as shown in FIGURE 8. The engine shaft is journaled in bearing 172 supported by the engine block adjacent to the cylinder head. A reduced portion of engine shaft 170 extends through axially positioned openings 109, shown in FIG. 7, of cylinder head 150, 106, shown in FIG. 6, of on-off valve 140, 107, shown in FIG. 5, of reversing valve 130, into splined opening 129, shown in FIG. 4, of rotary valve 120. The valve chest is housed within valve chest cover 110 which is secured to the cylinder head 150 and cylinder block 101 by bolts 195 passing through openings 196 and threaded into the block. The valve chest cover 110 is provided with cylinder chambers wherein control plungers 113 and 116 are respectively positioned on opposite sides thereof, as best shown in FIG. 2. The cylinder containing control plunger 113 is provided with an inlet opening 115 and an outlet opening 114, and the cylinder containing control plunger 116 is provided with inlet opening 118 and outlet opening 117. Output engine 100 is provided with inlet opening 111 which communicates with valve chest 105 and exhaust outlet 119 positioned through engine block 101.

Figure 4:
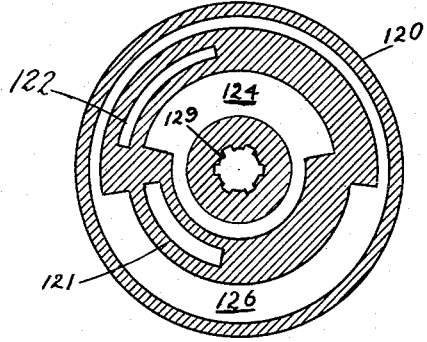
FIG. 4 is a sectional view taken on line 4—4 of FIG. 3 showing the rotary valve 120 and inlet and exhaust ports for both clockwise and counter-clockwise rotation.
Figure 5:
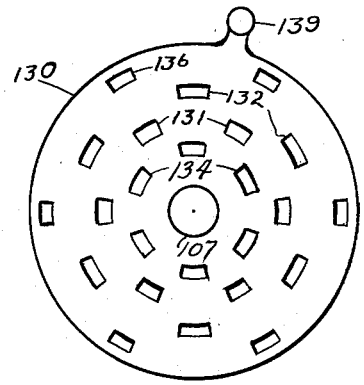
FIG. 5 is a plan view of the reversing valve 130 of FIG. 3.

The operation of output engine 100 is controlled by a plurality of valves in the form of apertured discs which are arranged in superimposed relation and located within valve chest 105. On-off valve 140 which is provided with ports 142, 144 and 146 (FIG. 6) is positioned in contact with cylinder head 150 and is provided with a central opening 106, best shown in FIG. 6, through which projects the reduced extension portion 103 of engine shaft 170. Reversing valve 130 which is provided with ports 131, 132, 134 and 136 (see FIG. 5) is positioned in contact with on-off valve 140 and has an axially located opening 107, shown in FIG. 5, through which shaft extension 103 projects. Rotary valve 120 is positioned in contacting relation with reversing valve 130 and is secured on the end of shaft extension 103 by splines 129 (see FIG. 4) whereby valve 120 rotates in unison with engine shaft 170. Rotary valve 120 is provided with ports 121, 122, 124 and 126, the arrangement of which is best shown in FIG. 4. On-off valve 140 and reversing valve 130 are free to rotate around shaft extension 103, but such rotation is independent of the rotation of the engine shaft since these valves are not fixed to the shaft extension 103. Control plunger 113, shown in FIG. 2, is mechanically connected at 139 to reversing valve 130, shown in FIG. 3, and the reciprocating movement of the plunger serves to rotate reversing valve through an angle of approximately 30°. Similarly, control plunger 116 is mechanically connected at 149 to on-off valve 140 and the reciprocating movement of plunger 116 serves to rotate the on-off valve through an angle of approximately 30°.

The reciprocating movements of pistons 108 in engine block 101 is translated into the rotary motion of engine shaft 170 by connecting rods 168 and wobble plate 174 which is fixedly secured to engine shaft 170 in angular relation thereto. Connecting rods 168 are formed with spherical end surfaces 167 and 169. End 167 of each of the connecting rods fits within a socket 163 in piston 108 and is maintained in position by an annular collar 164 which is secured and fixed in position by threaded member 165 which co-acts with internal threads located on the inner piston wall. End 169 of each of the connecting rods is fitted into a socket 179 formed in connecting rod bearing plates 178 and 180 and these plates are journaled to the wobble plate 174 by bearing 176. In order to hold connecting rods 168 in line with cylinders 102, a torque ring 183 is held by trunnion screws 184 in engine block 101, and this ring has trunnion pins 182 (see FIG. 9) connecting it to connecting rod bearing plates 178 and 180 appearing in FIG. 3.

The cylinder head 150 is provided with apertures 158 in which compression discharge valves 159 are positioned. Pistons 108 are provided with apertures 161 which communicates with passages 166 located in threaded member 165 which have openings at the bottom of the pistons and the apertures 161 are provided with compression admission valves 162.

FIGS. 4, 5, 6, and 7 show details of the valves in relative position for clockwise rotation. In this position reversing ports 131 are open to On-Off valve ports 142, and On-Off valve ports 142 are open to cylinder head ports 152 to cylinders 102 of FIG. 8. Exhaust ports 134 are open to On-Off valve ports 144 and to cylinder head ports 154. By rotating reversing valve 130 counter-clockwise 30° the ports 132 are open to 142 to 152 and reversing exhaust valve ports 136 are open to 146 to 156 to 106 FIG. 8, while valve ports 131 and 134 are closed to On-Off valve ports 142 and 144. If On-Off valve 140 is rotated 30° counter-clockwise, all ports to 150 are closed and compression admission valves 162 and discharge valves 159 become operative and the engine functions as an air compressor.

FIG. 10 shows registry of valve ports during admission with clockwise rotation. Here gas which entered valve chest 110 of FIG. 3 through port 111 passes through port 121 of rotary valve 120, port 131 of reversing valve 130, port 142 of On-Off valve 140 and port 152 of cylinder head 150 to cylinder 102 of FIGS. 3 and 8.

FIG. 11 shows registry of valve ports during the latter part of the work stroke after valve 120 has turned, cutting off admission to port 131.

FIGS. 12 and 13 show registry of ports during the exhaust stroke where gas from cylinder 102 FIGS. 3 and 8 passes through cylinder head port 152, On-Off valve port 142, reversing valve port 131, exhaust port 124 in rotary valve 120, exhaust port 134 in reversing valve 130, exhaust port 144 in On-Off valve 140, exhaust port 154 in cylinder head 150, and exhaust passages 104 FIG. 8 to crank case 100 and exhaust passages 119 of FIG. 3.

FIG. 14 shows registry of valve ports for admission after reversing valve 130 has been turned for counter-clockwise rotation. Here gas from valve chest 110 FIG. 3 passes through port 122 of rotary valve 120, reversing valve port 132, On-Off valve port 142, cylinder head port 152 to cylinder 102 FIG. 8.

FIG. 15 shows registry of valve ports during the latter part of the work stroke after valve 120 has turned cutting off admission to port 132.

FIGS. 16 and 17 show registry of valve ports during the exhaust stroke where gas from cylinder 102 FIGS. 3 and 8 is discharged through cylinder head port 152, On-Off valve port 142, reversing valve port 132, exhaust port 126 in rotary valve 120, exhaust port 136 in reversing valve 130, exhaust port 146 in On-Off valve 140, exhaust port 156 in cylinder head 150, and exhaust passages 106 FIG. 8 to crankcase 100, and exhaust passages 119 FIG. 3.

FIG. 18 shows On-Off valve 140 turned to close all cylinder head ports 152, 154, and 156, converting engine into an air compressor, when air is admitted through piston ports 161 FIG. 3, past valve 162 and discharged through cylinder head port 158 past valve 159 to valve chest 110.

This single rotary valve 120 serves all cylinders giving the constant cut-off required by the constant pressure ratio in the gas receivers $P_1$ and $P_2$ as maintained by the thermo-compressor. Used in conjunction with the reversing valve, the On-Off valve, and other controls, this engine can be used to give a wide range of torques positive or negative at all speeds forward or backward.

As valve 51 is opened gas from pressure chamber $P_2$ flows through the pipe 264 to intake 111 of output motor 100. Pressure builds up in lines 264 and 265 until relieved by the output motor rotation. The output motor now runs at a speed dependent upon the throttle opening.

As the gas passes through output engine 100 it expands and the temperature falls materially. The cooled exhaust gas is discharged through exhaust connection pipe 266, through brake valve 210, and pipe 258 to thermostat valve 257, bypass line 253 or cooling coil 254, line 251 to thermo-compressor or line 250 to low pressure receiver $P_1$. When refrigeration is desired thermostat 255 is set by adjusting screw 256 to divert part, or all, of the cold exhaust through the cooling coil 254.

If torque requirement exceeds the motor torque obtainable by the working pressure in receiver $P_2$ the pressure at the output motor 100 approaches the pressure of $P_2$ and the pressure on the pistons 53 and 55 of the torque control and the force of spring 56 will act through lever 69 to open the loader valve 68 allowing high pressure gas from $P_3$ to be admitted to raise the pressure in $P_2$ until engine 100 runs under the increased torque. As soon as the pressure drop at speed control valve 51 is reestablished to overcome the force of spring 56, loader valve 68 closes, and output motor 100 runs at a speed proportional to the throttle opening, since more gas flows through a given area when the pressure is increased.

When the torque load on output motor 100 is decreased the pressure in lines 264 and 265 and the force of torque control piston 55 are also decreased. This allows the pressure in working pressure receiver $P_2$ acting on torque control piston 53 to move against the force of spring 56 and the pressure on piston 55. This movement of piston 53 acting through levers 72 and 71 opens valve 70 admitting working pressure gas to the power cylinder 78 of the unloader compressor (78 and 79). Also this movement acting through lever 73 opens valve 74 to admit gas from the exhaust pressure receiver $P_1$ to the compressor cylinder 79 of the unloader compressor 78 and 79. This unloader compressor now takes gas from $P_1$ through lines 250, and 252 compresses it and discharges it through line 275 to high pressure receiver $P_3$.

The operation continues until the working pressure in $P_2$ is just sufficient to carry the torque, or until the working pressure acting on 58 is just sufficient to balance the force of working pressure control spring 61 when valves 70 and 74 close to stop the operation of motor 78 and compressor 79.

When reversing valve 52 is turned 90° counter-clockwise, working pressure from $P_2$ is admitted through line 267 to connection 114 to act on reverse control piston 113 and turn reversing valve 130 30° counter-clockwise to run output motor counter-clockwise.

In FIG. 1 brake control valve assembly (200 to 225) is shown in the released position. Pressure from working pressure receiver $P_2$ acts through line 270, ports 223, 206, and 224, and connection 117 on On-Off plunger 116 to hold On-Off valve 140 in the On position to operate 100 as an engine with exhaust open through pipe 266, ports 212 and 211, pipes 258, 253, and 250, to exhaust receiver $P_1$.

When the manually operable brake pedal 200 is pressed, the valve 201 moves to open port 223 to 222, and port 220 to 215. This admits pressure from pressure chamber $P_2$ to act on On-Off valve control plunger 116 moving On-Off valve 140 to the Off position, so that engine 100 functions as a compressor taking gas from exhaust gas receiver $P_1$ through pipe 250, 253, and 258, ports 211 and 212, and pipe 260, and discharging it through ports 220 and 215, and line 260 back to the low pressure receiver $P_1$. This allows the engine 100 to run without braking effect. As the brake pedal is further depressed, piston 203 closes port 215, so the gas taken from pressure chamber $P_1$ through pipes 250, 253, and 258, ports 211 and 212, and pipe 266, is compressed and discharged through connection 112, ports 220 and 216, past valve 217, through pipe 270 to working pressure receiver $P_2$. The intake and discharge pressures act on brake piston 203 giving a reaction on the brake pedal which is proportional to the braking force on the output motor 100. This compression of the gas from pressure chambers $P_1$ and $P_2$ takes the load off the thermo-compressor and stores compressed gas in chamber $P_2$ to be used when power output is again required.

Further depression of the brake pedal 200 closes port 216, so that the gas taken from chamber $P_1$ is compressed and discharges through port 218, past valve 219, through pipe 280, to high pressure receiver $P_3$. If this braking action is continued pressure in pressure chamber $P_1$ decreases until the braking action is decreased, due to the low pressure in the compressor during the first of the compression stroke.

Still further depression of the brake pedal 200 closes port 211 and opens port 214, so gas is taken from pressure chamber $P_2$ through pipe 270, ports 214 and 213, pipe 266, and it is compressed and discharged through port 218, pipe 280, to pressure chamber $P_3$. This braking action if continued reduces the pressure in chamber $P_2$ to below the working pressure setting of spring 61, so that working pressure control piston 58 acting through lever 69 opens valve 68 to admit gas from chamber $P_3$ to maintain minimum working pressure in pressure chamber $P_2$.

If brake pedal 200 is still further depressed, piston 203 partly covers port 218 to give a throttling action to increase the braking effort. During the braking, the heat generated is taken to the receiver either pressure chamber $P_2$ or pressure chamber $P_3$ where it is dissipated so that braking may be continued indefinitely without overheating.

During the braking period check valve 227 has remained closed to prevent gas at high pressure from entering lines 264 and 265, and from acting on piston 55 and opening torque control valve 68, when extra working pressure is not required.

When the brake pedal is released port 224 is closed to 225, and opened to port 223, and port 222 is closed to port 223 and opened to port 221. This allows gas from the working pressure receiver $P_2$ to flow through pipe 270, ports 223 and 224, and connection 117, to move On-Off control plunger 116, and rotate On-Off valve 140 30° clockwise to the On position, compressor discharge port 220 is closed to brake cylinder 210 and port 212 is opened to port 211, allowing engine exhaust to flow from exhaust connection 119 through pipe 266, ports 212 and 211, pipes 253 and 251 to thermo-compressor, or from pipe 253 through pipe 250 to low pressure gas receiver $P_1$. The output engine 100 is now responsive to throttle valve 51 and reverse valve 52.

As seen from the foregoing, this engine consists of a thermo-gas compressing unit that automatically maintains a substantially constant pressure ratio $P_2/P_1$, a reversible constant cut-off output engine for utilizing this constant $P_2/P_1$, a system of valves together with a small gas driven gas compressor for controlling the pressure to meet the varying torque requirements.

I claim:

1. In a thermo-gas compressing device, the combination comprising, a cylinder having a first portion positioned at one end of said cylinder, means for heating said first portion, a second portion positioned at the opposite end of said cylinder, means for cooling said second portion, a heat regenerator, conduit means comprising a passage extending between the interiors of said first and second portions and passing through said heat regenerator, a gas transfer piston positioned for reciprocating movement within said cylinder, a surge chamber, a power cylinder having one end thereof in communication with said surge chamber, a plunger positioned in said power cylinder having one side of said plunger exposed to the pressure within said cylinder and the other side of said plunger exposed to the pressure within said surge chamber and means connecting said plunger to said gas transfer piston.

2. In a thermo-gas compressing device, the combination comprising, a cylinder having a first portion positioned at one end of said cylinder, means for heating said first portion, a second portion positioned at the opposite end of said cylinder, means for cooling said second portion, a heat regenerator, conduit means comprising a passage extending between the interiors of said first and second portions and passing through said heat regenerator, a gas transfer piston positioned for reciprocating movement within said cylinder, a surge chamber, a power cylinder having one end thereof in communication with said surge chamber, a plunger positioned in said power cylinder having one side of said plunger exposed to the pressure within said cylinder and the other side of said plunger exposed to the pressure within said surge chamber, means connecting said plunger to said gas transfer piston, a by-pass extending between the second portion of said cylinder and said surge chamber, and means for controlling the flow of gas through said by-pass in accordance with the position of said plunger in said cylinder.

3. In a thermo-gas compressing device, the combination comprising, a furnace chamber, a cylinder having a first portion at one end thereof which is positioned within said furnace, a second portion positioned at the opposite end of said cylinder, means for cooling said second portion, a heat regenerator, a cylinder liner concentrically positioned within said cylinder in spaced relation to the wall thereof providing a gas passage between said cylinder wall and said liner extending intermediate said first and second portions and through said heat regenerator, a gas transfer piston supported for reciprocating movement within said cylinder in close proximity to but without contacting said liner, a first pressure chamber, a second pressure chamber, a first conduit means connecting said first pressure chamber and said second portion of said cylinder, a check valve connected in said first conduit to permit gas to flow from said first pressure chamber to said second portion of said cylinder, a second conduit means connecting said second pressure chamber and said second portion of said cylinder, a differential pressure valve positioned in said second conduit means actuated to open position when the pressure within said cylinder exceeds the pressure within said first pressure chamber, and a check valve to permit flow from said second portion of said cylinder to said second pressure chamber.

4. In a thermo-gas compressing device, the combination comprising, a furnace structure provided with a vertically disposed combustion chamber, a cylinder having a first portion at the upper end thereof positioned within said furnace, a second portion positioned at the opposite end of said cylinder, means to cool said second portion, a heat regenerator positioned intermediate the ends of said cylinder, a burner positioned in the upper portion of said combustion chamber, a fuel source, means to supply fuel to said burner from said fuel source, a thermostat responsive to the temperature within the upper portion of the combustion chamber connected to control the fuel flow from said source to said burner, a stack, first conduit means for conveying combustion air to upper portion of said furnace, a second conduit means adjacent to first conduit means for conveying gases from lower portion of said furnace to the stack, a thermal responsive unit positioned at the lower end of the furnace adjacent to second conduit means, power means for circulating combustion air through said first conduit, and means for controlling the operation of said power means by said thermal responsive unit.

5. In an external combustion engine, the combination comprising, a thermo-gas compressing unit having a gas inlet and outlet, a first pressure chamber connected to said gas inlet from which gas is removed by the operation of said compressing unit, a second pressure chamber connected to said gas outlet to which gas is delivered by said compressing unit, a third pressure chamber confining a gas under a pressure exceeding the pressure in said second pressure chamber, an output engine having an inlet and an outlet, a first conduit means connecting said second pressure chamber to the inlet of said output engine, an adjustable pressure reducing valve within said first conduit means, a second conduit means connecting the outlet of said output engine to said first pressure chamber, and a differential valve connected to said second pressure chamber and to the inlet of said output engine, said differential valve actuated by the pressure of said second pressure chamber and the pressure existing at the inlet of said output engine to effect a passage between said third pressure chamber and said second pressure chamber when the pressure at said output engine inlet equals the pressure in said second pressure chamber.

6. In an external combustion gas engine, the combination comprising, a thermo-gas compressing unit having a gas inlet and outlet, a first pressure chamber connected to said gas inlet from which gas is removed by the operation of said compressing unit, a second pressure chamber connected to said outlet to which gas is delivered by said compressing unit, a third pressure chamber, a fluid pump having an inlet connected to said first pressure chamber and an outlet connected to said third pressure chamber, a gas driven motor mechanically connected to drive said fluid pump, the intake of said gas driven motor connected by conduit means to said second pressure chamber and the outlet of said gas driven motor connected to said first pressure chamber, an output engine having the inlet thereof connected to said second pressure chamber by a pipe, adjustable pressure reducing means located in said pipe and the outlet of said output engine connected to said first pressure chamber, first valve means positioned in said conduit means extending between said intake of the gas driven motor and second pressure chamber, second valve means positioned in said connection between said first pressure chamber and the inlet of said fluid pump, and actuating means for opening said first and second valve means comprising a piston operated by the differential pressure between the pressure of said second pressure chamber and the pressure within the inlet of said output engine.

7. In an external combustion gas engine, the combination comprising, a thermo-gas compressing unit having a gas inlet and gas outlet, a first pressure chamber connected to said gas inlet from which gas is removed by the operation of said compressing unit, a second pressure chamber connected to said gas outlet to which gas is delivered by said compressing unit, a third pressure chamber unit, a fluid pump having an inlet connected to atmosphere and an outlet connected to said third pressure chamber, a gas driven motor provided with an intake and an outlet, means mechanically connecting said gas driven motor and said fluid pump, the intake of said gas driven motor connected by conduit means to said second pressure chamber and the outlet of said gas driven motor connected to said first pressure chamber, and valve means in said conduit means between the intake of said gas driven motor and said second pressure chamber operable to closed position by the pressure existing in said third pressure chamber.

8. In an external combustion gas engine, the combination comprising, a thermo-gas compression unit having a gas inlet and a gas outlet, a first pressure chamber connected to said gas inlet from which gas is removed by the operation of said compressing unit, a second pressure chamber connected to said gas outlet to which gas is delivered by said compressing unit, a third pressure chamber, a fluid pump having an inlet connected to said first pressure chamber and an outlet connected to said third pressure chamber, a gas driven motor mechanically connected to drive said fluid pump, the intake of said gas driven motor connected by conduit means to said second pressure chamber and the outlet of said gas driven motor connected to said first pressure chamber, an output engine provided with an inlet and an outlet, means connecting the inlet thereof to said second pressure chamber and the outlet to said first pressure chamber, first valve means positioned in said conduit means extending between said intake of the gas driven motor and second pressure chamber, second valve means positioned in said connection between said first pressure chamber and the inlet of said fluid pump, actuating means for opening said first and second valve means comprising a piston operated by the differential pressure between the pressure of said second pressure chamber and the pressure within the inlet of said output engine, and means for rendering the aforesaid actuating means inoperative to open said first and second valve means when the pressure within the second pressure chamber is below a predetermined value.

9. In an external combustion gas engine the combination comprising a thermo-gas compressing unit having a gas inlet and a gas outlet, a first pressure chamber connected to said gas inlet from which gas is removed by the operation of said compressing unit, a second pressure chamber connected to said gas outlet to which gas is delivered by said compressing unit, an output motor-compressing unit operable by fluid pressure as a motor and by an external source of power as a compressor provided with a first port which serves as an inlet when operated as a motor and as an outlet when operated as a compressing unit, and a second port which serves as an outlet when operating as a motor and an inlet when operated as a compressing unit, a first conduit means connecting said second pressure chamber to said first port, a valve positioned in said first conduit means for controlling the flow of gas therethrough, a second conduit means connecting said second port to said first pressure chamber, a third conduit means connecting said first port and said first pressure chamber, and manually controlled valve means positioned between said first conduit means and said third conduit means whereby first conduit means may be closed and third conduit means may be opened to convert said output motor into a compressor.

10. In an external combustion gas engine the combination comprising, a thermo-gas compressing unit having a gas inlet and gas outlet, a first pressure chamber connected to said gas inlet from which gas is removed by the operation of said compressing unit, a second pressure chamber connected to said gas outlet to which gas is delivered by said compressing unit, an output motor-compressing unit operable by fluid pressure as a motor and by an external source of power as a compressor provided with a first port which serves as an inlet when operated as a motor and as an outlet when operated as a compressing unit, and a second port which serves as an outlet when operating as a motor and an inlet when operated as a compressing unit, a first conduit means connecting said second pressure chamber and said first port, a check valve positioned in said first conduit means to permit flow of gas from said first port of engine compressor to said second pressure chamber, a second conduit means connecting said second port to said first pressure chamber, a third conduit means connecting said first port to said first pressure chamber, and manually controlled valve means positioned in said third conduit means for controlling the flow of gas from said first port to said first pressure chamber during rotation of said output motor-compressing unit.

11. In an external combustion gas engine the combination comprising, a thermo-gas compressing unit having a gas inlet and a gas outlet, a first pressure chamber connected to said gas inlet from which gas is removed by the operation of said compressing unit, a second pressure chamber connected to said gas outlet to which gas is delivered by said compressing unit, a third pressure chamber, an output motor-compressing unit operable by fluid pressure as a motor and by an external source of power as a compressor provided with a first port which serves as an inlet when operated as a motor and as an outlet when operated as a compressing unit, and a second port which serves as an outlet when operated as a motor and an inlet when operated as a compressing unit, a first conduit means connecting said second pressure chamber and said first port, a manually controlled valve positioned in said first conduit means for controlling the flow of gas therethrough, a second conduit means connecting said second port and said first pressure chamber, a third conduit means connecting said first port and said third pressure chamber, and a check valve means positioned in said third conduit means for controlling the flow of gas from said first port to said third pressure chamber during the rotation of said output motor-compressing unit.

12. In an external combustion gas engine the combination comprising, a thermo-gas compressing unit having a gas inlet and a gas outlet, a first pressure chamber connected to said gas inlet from which gas is removed by the operation of said compressing unit, a second pressure chamber connected to said gas outlet to which gas is delivered by said compressing unit, a third pressure chamber, an output motor-compressing unit operable by fluid pressure as a motor and by an external source of power as a compressor provided with a first port which serves as an inlet when operated as a motor and as an outlet when operated as a compressing unit, and a second port which serves as an outlet when operating as a motor and an inlet when operated as a compressing unit, a first conduit means connecting said second pressure chamber and said second port, a second conduit means connecting said first port to said third pressure chamber, a third conduit means connecting said third pressure chamber with said second pressure chamber, manually operated valve means positioned in said second conduit means for controlling the flow of gas therethrough, and a valve actuated by the pressure existing in the second pressure chamber positioned in said third conduit means for controlling the flow of gas between said third pressure chamber and said second pressure chamber.

13. In a thermo-gas compressing device, the combination comprising, a closed cylinder having a first portion positioned at one end of said cylinder, means for heating said first portion, a second portion positioned at the opposite end of said cylinder, means for cooling said second portion, means located within said closed cylinder comprising a passage extending between the interiors of said first and second portions, said closed cylinder provided with gas inlet and outlet means, a gas transfer piston positioned for reciprocating movement within said closed cylinder, a surge chamber, a plunger cylinder communicating at one end thereof with one of said portions of said closed cylinder, passage means connecting the other end of said plunger cylinder with said surge chamber, a plunger secured to said gas transfer piston and slidably supported by said plunger cylinder, and motion defining means for said gas transfer piston comprising a crank shaft mounted for rotation and an operable connection between said crank shaft and said gas transfer piston comprising said plunger.

14. In a thermo-gas compressing device, the combination comprising, a closed cylinder having a first portion positioned at one end of said cylinder, means for heating said first portion, a second portion positioned at the opposite end of said cylinder, means for cooling said second portion, means located within said closed cylinder comprising a passage extending between the interiors of said first and second portions, a gas transfer piston positioned for reciprocating movement within said closed cylinder, a surge chamber, a plunger cylinder communicating at one end thereof with one of said portions of said closed cylinder, passage means connecting the other end of said plunger cylinder with said surge chamber, a plunger connected to said gas transfer piston which plunger is slidably received by said plunger cylinder, motion defining means for said gas transfer piston and plunger comprising a crankshaft mounted for rotation, and an operable connection between said crankshaft and said plunger, a first pressure chamber, a second pressure chamber, and passage means connecting said first pressure chamber and said second pressure chamber with said second portion of said closed cylinder, valve means positioned in said passage means to prevent the flow of gas from said closed cylinder to said first chamber and from said second chamber to said closed cylinder.

15. In a thermo-gas compressing device, the combination comprising a closed cylinder having first and second portions at opposite ends thereof and having a gas inlet and a gas outlet, means for heating said first portion, means for cooling said second portion, a gas transfer piston positioned within said cylinder for reciprocating motion between the first and second portions thereof, said cylinder being provided with a passage extending between said first and second portions for the flow of gas therebetween upon reciprocation of said piston, a plunger cylinder, a plunger operatively connected to said piston and reciprocably disposed within said plunger cylinder, passage providing means extending between said piston cylinder and said plunger cylinder for the flow of gas therebetween only when said piston reaches the limits of its reciprocating movement, and motion defining means for said transfer piston and plunger comprising a crankshaft mounted for rotation and an operable connection between said crankshaft and said connected piston and plunger.

16. In a thermo-gas compressing device, the combination comprising a piston cylinder having upper and lower end portions and having a gas inlet and outlet, means for heating said upper portion, means for cooling said lower portion, a gas transfer piston positioned within said cylinder for reciprocating motion between the upper and lower portions thereof, said piston cylinder being provided with a passage between said upper and lower portions for the flow of gas therebetween upon reciprocation of said piston, a plunger cylinder below said piston cylinder, a plunger operatively connected to said piston and reciprocably disposed within said plunger cylinder, passage providing means extending between said piston cylinder and said plunger cylinder below said plunger, and gas flow control means for placing said respective cylinders in communication through said passage providing means only when said piston has reached the upper and lower limits of its reciprocatory movement.

17. The structure of claim 16 in which said device is equipped with motion-defining means for said piston and plunger comprising a crankshaft mounted for rotation and operatively connected thereto.

18. The structure of claim 16 in which said device is provided with a surge chamber communicating with said plunger cylinder below said plunger.

References Cited in the file of this patent

UNITED STATES PATENTS

| | | |
|---|---|---|
| 22,956 | Jameson | Feb. 15, 1859 |
| 228,716 | Woodbury et al. | June 8, 1880 |
| 437,320 | Vivian | Sept. 30, 1890 |
| 601,031 | Anderson et al. | Mar. 22, 1898 |
| 668,626 | Cronwall | Feb. 26, 1901 |
| 1,809,409 | Granger | June 9, 1931 |
| 1,920,104 | Pescara | July 25, 1933 |
| 2,020,923 | Von Seggern | Nov. 12, 1935 |
| 2,157,229 | Bush | May 29, 1939 |

FOREIGN PATENTS

| | | |
|---|---|---|
| 2,999 | Great Britain | Dec. 7, 1860 |
| 312,589 | Great Britain | May 29, 1929 |